United States Patent [19]

Ebina et al.

[11] Patent Number: 4,812,829

[45] Date of Patent: Mar. 14, 1989

[54] THREE-DIMENSIONAL DISPLAY DEVICE AND METHOD FOR POINTING DISPLAYED THREE-DIMENSIONAL IMAGE

[75] Inventors: Osamu Ebina, Atsugi; Seigo Ono, Kofu, both of Japan

[73] Assignee: Hitachi, Ltd., Tokyo, Japan

[21] Appl. No.: 48,724

[22] Filed: May 11, 1987

[30] Foreign Application Priority Data

May 17, 1986 [JP] Japan .................................. 61-113192
Aug. 21, 1986 [JP] Japan .................................. 61-195762

[51] Int. Cl.⁴ .............................................. G09G 1/16
[52] U.S. Cl. ..................................... 340/709; 340/706
[58] Field of Search ............... 340/706, 709, 717, 700; 273/DIG. 28; 358/89, 88, 90

[56] References Cited

U.S. PATENT DOCUMENTS 3,883,861  5/1975  Heartz ................................. 340/709
4,552,360  11/1985  Bromley ............................. 340/709
4,698,625  10/1987  McCaskill et al. ................. 340/709

OTHER PUBLICATIONS

Cathode Ray Stereovectorscope, Homer B. Tilton, SPIE, vol. 199, 1979.

Primary Examiner—John W. Caldwell, Sr.
Assistant Examiner—Alvin Oberley
Attorney, Agent, or Firm—Antonelli, Terry & Wands

[57] ABSTRACT

A display device comprises a display, an input and a controller. The display displays a three-dimensional image, a vector cursor and a pointing image extending in a direction of movement of the vector cursor. The controller generates a display signal to display the three-dimensional image, vector cursor and pointing image. The controller recognizes the three-dimensional image crossing to the pointing image in response to the pointing signal from the input.

8 Claims, 11 Drawing Sheets

FIG. 5

| NO. | REGISTER CONTENT | VALUE |
|---|---|---|
| 1 | VECTOR CURSOR POSITION (= START POINT OF POINTING SEGMENT) | $(P_{cx}, P_{cy}, P_{cz})$ |
| 2 | VECTOR CURSOR VELOCITY VECTOR (DIRECTION = DIRECTION OF POINTING SEGMENT) | $(V_x, V_y, V_z)$ |
| 3 | POINTING SEGMENT END POINT (= CROSS POINT TO POINTING IMAGE) | $(P_{tx}, P_{ty}, P_{tz})$ |
| 4 | n-TH CLOSER IMAGE TO SEGMENT START POINT | n |
| 5 | ID OF POINTED (HIGHLIGHTED) IMAGE | IMAGE ID |

FIG. 11

| NO | REGISTER CONTENT | VALUE |
|---|---|---|
| 1 | VECTOR CURSOR POSITION (=POINTING RADIAL IMAGE APEX) | $(P_{cx}, P_{cy}, P_{cz})$ |
| 2 | VECTOR CURSOR VELOCITY VECTOR (DIRECTION = DIRECTION OF POINTING RADIAL IMAGE) | $(V_x, V_y, V_z)$ |
| 3 | TYPE OF POINTED IMAGE | IMAGE TYPE CODE |
| 4 | n-TH CLOSER IMAGE TO APEX OF POINTING RADIAL IMAGE | n |
| 5 | ID OF DISPLAYED (HIGHLIGHTED) IMAGE | IMAGE ID |
| 6 | COORDINATE OF POINTED POINT (IF POINT IS POINTED) | $(P_{tx}, P_{ty}, P_{tz})$ |

THREE-DIMENSIONAL DISPLAY DEVICE AND METHOD FOR POINTING DISPLAYED THREE-DIMENSIONAL IMAGE

CROSS-REFERENCE TO RELATED APPLICATION

This application relates to an application U.S. Ser. No. 375 entitled Three-Dimensional Display Apparatus by Seigo Ono and Osamu Ebina and assigned to the present assignee, based on Japanese Patent Application No. 1089/86 filed on Jan. 7, 1986.

BACKGROUND OF THE INVENTION

The present invention relates to threedimensional image display device and pointing of a display three-dimensional image.

In a display device, a two-dimensional CRT display, liquid crystal display or plasma display is used to display an image, and a two-dimentional pointing device such as a mouse or table is sued to point to a displayed image. On the other hand, as image display processing techniques advance, a three-dimensional display can be relatively easily displayed on such a two-dimensional planar display.

The display of the three-dimensional information by the two-dimensional planar display can be implemented by shade/line processing or reflected light processing as disclosed in "Real Image Generation by Computer Graphics and Its Applications" Pixel No. 32, (1985-5).

When a three-dimensional image displayed on a two-dimensional planar display is to be pointed out by a pointing device, a depth coordinate cannot be designated because a space which is inherently three dimensional is projected on a two-dimensional plane and the pointing device can designate only a two-dimensional coordinate. Thus, it two images which are spaced from each other in the three-dimensional space are projected in overlapping relationship on the two-dimensional display plane, they cannot be distinguished.

SUMMARY OF THE INVENTION

It is an object of the present invention to provide a three-dimensional display device which projects a three-dimensional image on a two-dimensional plane and which can point to the three-dimensional image easily and precisely.

Display arrangement of the present invention displays a three-dimensional image, a vector cursor which moves on a display screen and a pointing image which extends from the vector cursor in a direction of movement of the vector cursor. Control means generates display signals for displaying the three-dimentional image, vector cursor and pointing image. The control means responds to a pointing signal from input means to recognize the three-dimensional image crossing the pointing image as a pointed to image.

BRIEF DESCRIPTION OF THE DRAWINGS

FIG. 5 shows a content of a register for a vector cursor pointing segment parameter.

FIG. 11 shows a content of a register for a vector cursor pointing radial image parameter.

DESCRIPTION OF THE PREFERRED EMBODIMENTS

Various embodiments of the present invention will be explained in detail with reference to the drawings.

Figure 1:
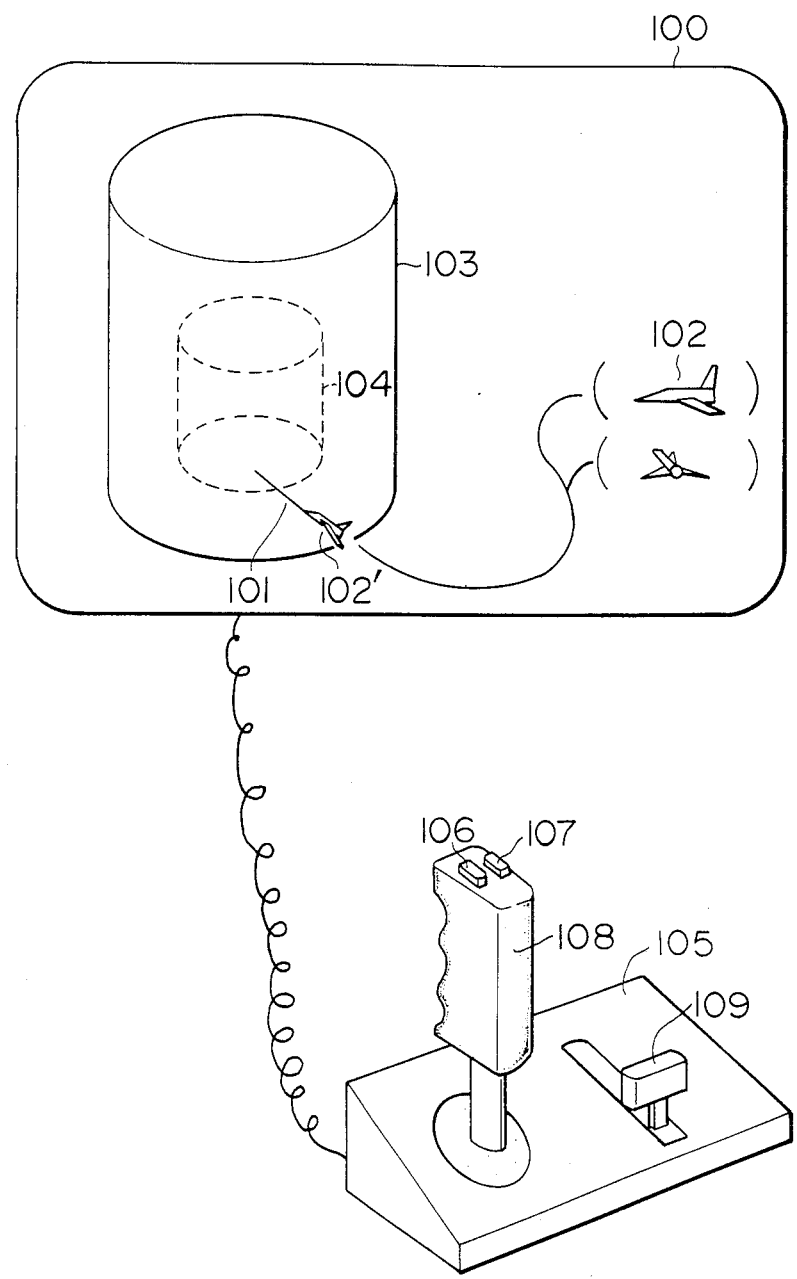
FIGS. 1 to 3 show one embodiment of the present invention.
Figure 2:
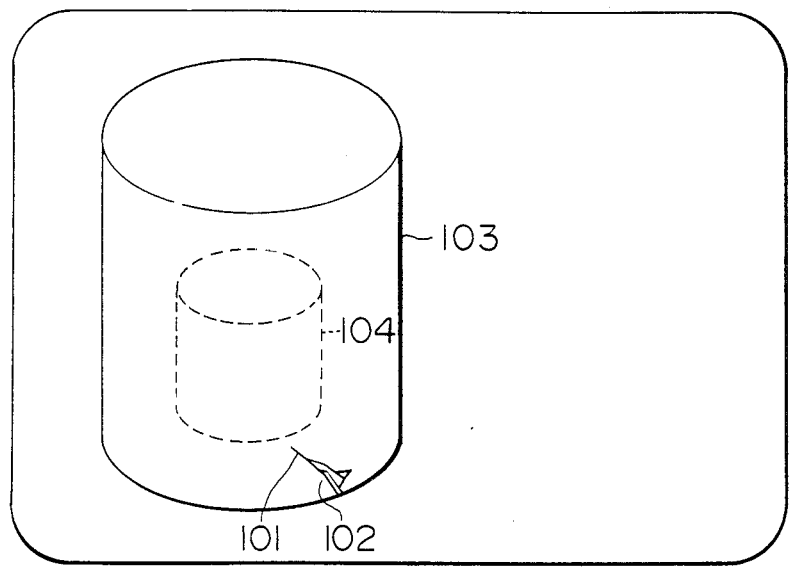
Figure 3:
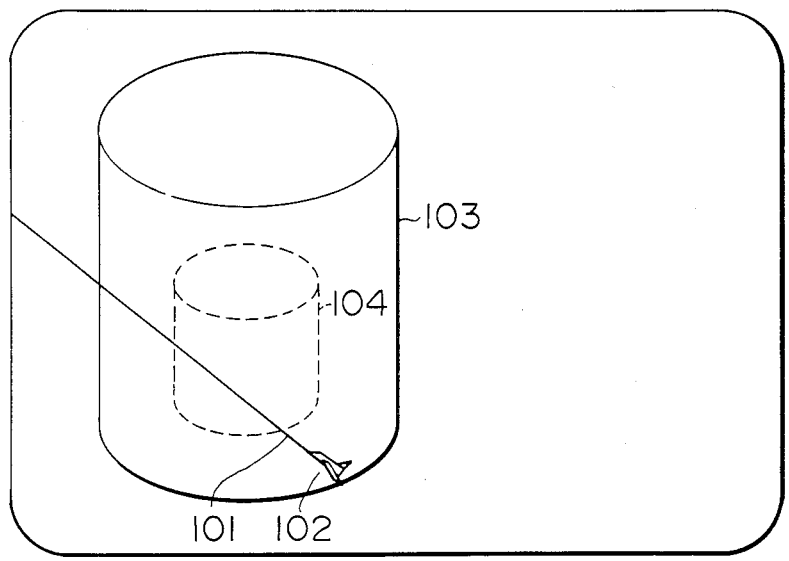

Referring to FIGS. 1 to 3, the image pointing operation in a first embodiment will be explained. In FIG. 1, a cylinder 103 and a cylinder 104 which is present in the displayed three-dimensional space are displayed on a display screen 100. The display is made by a line drawing or by semitransparent coloring so that an image hidden by another image may be viewed. A segment or pointer 101 in the form of a straight line can be set at a selected position on the display screen by moving a vector cursor 102. A start point of the line segment 101 is formed on the vector cursor 102, and the direction of the line segment 101 matches the direction of a velocity vector of the vector cursor 102 which continuously moves in the display space. The line segment extends in the direction of the velocity vector until it crosses or intersects the surface of a displayed image, and if there is no crossing of an image in that direction it extends indefinitely. The vector cursor is provided with a velocity vector in addition to a position coordinate, as described in U.S. patent application Ser. No. 375, now U.S. Pat. No. 4,766,423.

Let us assume that an operator intends to point to the cylinder 104 and input an identification of the cylinder 104 to a host device. The operator manipulates a three-dimensional input device 105 to move the vector cursor 102 so that a pointer or line segment 101, which has an end of the vector cursor 102 as a start point, passes in a direction through the cylinder 104. The three-dimensional input device 105 has a joy stick 108 for controlling the direction of the vector cursor and a slide volume 109 for controlling the velocity of the vector cursor. The joy stick 108 has an input pointing switch 106 and a "next closer" pointing switch 107 thereon. The velocity of the vector cursor (speed and direction) can be changed by the joy stick 108 and the slide volume 109.

When the operator moves the vector cursor from the position 102 to a position 102', the following cases may occur depending on the positional relationship of the cylinders 103 and 104 and the direction of the pointer or line segment.

(1) The line segment 101 crosses (intercepts a boundary of) the cylinder 104 (FIG. 1)

This occurs when the vector cursor is between the cylinders 103 and 104 and has an inward velocity vector. In this case, the cylinder 104 is highlighted.

(2) The line segment 101 crosses the cylinder 103 (FIG. 2)

This occurs when the vector cursor is outside of the cylinder 103 and the velocity vector is directed toward the cylinder 103, or when the vector cursor is inside of the cylinder 103 and the velocity vector is not directed toward the cylinder 104 and the live segment is directed outward of the cylinder 103. In this case, the cylinder 103 is highlighted.

(3) The line segment 101 crosses none of the cylinders (FIG. 3)

This occurs when the vector cursor is outside of the cylinder 103 and the velocity vector is not directed toward the cylinders 103 and 104. In this case, neither the cylinder 103 nor the cylinder 104 is highlighted.

If the operator depresses the input pointing switching 106 under the condition (1), the pointing out of the cylinder 104 by the operator is recognized and the image ID of the cylinder 104 is reported to the host device. Under the condition (2), if there is the cylinder 104 on the extension of the line segment 101, the line segment is extended until it crosses the next closer image (FIG. 2→FIG. 1) by the depression of the "next closer" pointing switch 107, and the highlighted image is shifted from the cylinder 103 to the cylinder 104. When the input pointing switch 106 is now depressed, the image ID of the cylinder 104 is reported to the host device.

Figure 4:
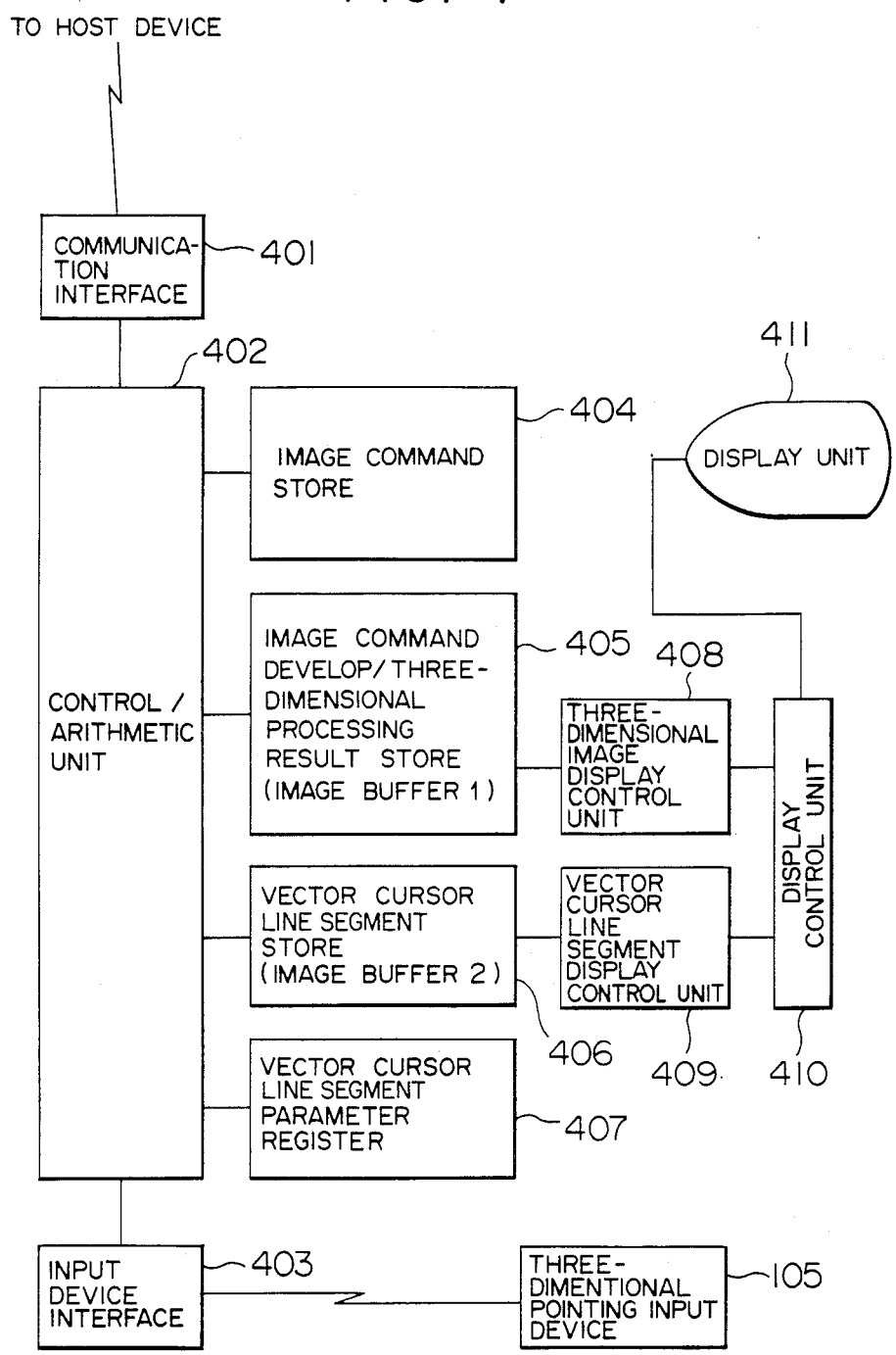
FIG. 4 shows a block diagram of the embodiment of the present invention.

FIG. 4 shows a block diagram of an embodiment of a display device of the present invention. An image command from the host device is received by a control-/arithmetic unit 402 through a communication interface 401, and it is stored in an image command store 404. After the reception, the image command in the image command store 404 is developed into dot information by the control/arithmetic unit 402, three-dimensionally processed such as by shading, and the result is stored in an image command develop/three-dimensional processing result store (image buffer 1) 405. The three-dimensional image display control unit 408 scans the image buffer 405 and transfers a display signal to a display control unit 410.

On the other hand, when the operator manipulates the three-dimensional pointing input device 105, the control/arithmetic unit 402 receives the information through an input device interface 403, and if it is information relating to the vector cursor, it is stored in a vector cursor line segment parameter register 407. When the register 407 is updated, the control/arithmetic unit 402 modifies the velocity vector of the vector cursor. The image of the vector cursor and line segment which vary from time to time in accordance with the updating of the content of the register 407 is stored in a vector cursor pointing line segment draw store (image buffer 2) 406. The content of the image buffer 406 is read by a vector cursor line segment display control unit 409 and transferred to a display control unit 410 in the form of a display signal. The display control unit 410 combines display signals from the three-dimensional image display control unit 408 and the vector cursor line segment display control unit 409 and displays the combined signal on a display unit 411.

FIG. 5 shows a content of the vector cursor line segment parameter register 407. A vector cursor position (pointing segment start point) #1 indicates a coordinate ($P_{cx}$, $P_{cy}$, $P_{cz}$) of the vector cursor position in a displayed three-dimensional space. This point is also a line segment start point. A vector cursor velocity vector #2 (whose direction corresponds to the direction of the pointer or line segment) represents a speed and a direction of the movement of the vector cursor by a vector ($V_x$, $V_y$, $V_z$). The velocity vector of the vector cursor is changed by the threedimensional pointing input device 105. When the joy stick 108 and the slide volume 109 are in their neutral positions, the immediately prior velocity vector is held and it continues to move in the three-dimensional display space. The direction of the pointer or line segment 101 corresponds to the direction of the velocity vector. A line segment end point #3 (cross point with the pointed image) represents a coordinate ($P_{tx}$, $P_{ty}$, $P_{tz}$) of one of the cross points of the line segment defined by #1 and #2 and the image in the three-dimensional display space, which meets a condition of #4, in which an integer n indicating the image number of the image close to the line segment start point to be displayed is stored. This value is modified by the switch 107 of the threedimensional pointing input device 105. A condition #5 shows an indentifier (image ID) of the pointed image (highlighted image) defined by the conditions #1–#4.

Figure 6:
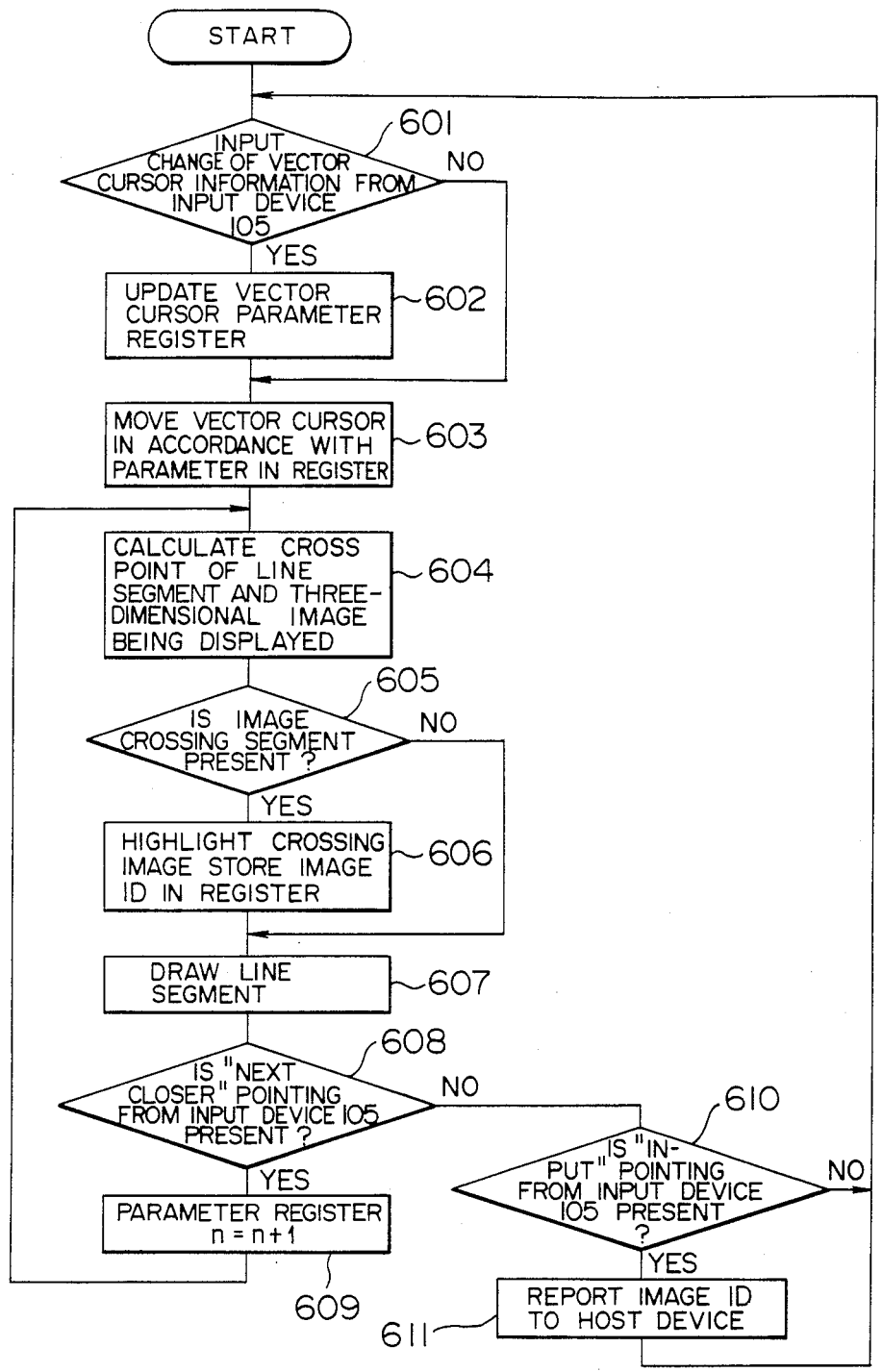
FIG. 6 shows a flow chart of an operation of a control/arithmetic unit of FIG. 4, FIGS. 7 to 9 show a second embodiment of the present invention.

FIG. 6 shows a flow chart of the operation of the present invention. It comprises vector cursor movement processing (steps 601–603), line segment and crossing image calculation and highlighting processing (steps 604–609) and input pointing processing (steps 610–611).

A type of input from the three-dimensional pointing input device 105 is determined (step 601), and if the input relates to the vector cursor, the process proceeds to a step 602, and if the input does not relate to the vector cursor, the process skips the step 602 and proceeds to a step 603. Information relating to the vector cursor is stored in the register 407 as shown in FIG. 5 (step 602), and the movement of the vector cursor changes accordingly. The next position of the vector cursor and the line segment are determined in accordance with the velocity vector of the vector cursor indicated by the register 407 (step 603), and a cross point with the three-dimensional image being displayed is calculated (step 604). Whether a cross point on the image is present or not is checked (step 605), and if it is present, the image is highlighted and the image ID is stored into the register 407 (step 606). Then, a line segment is drawn (step 607). Then, whether the "next closer" is requested by the input device 105 (switch 107) or not is checked (step 608), and if it is, the content n of the register 407 is incremented by one (step 609), and the process repeats the step 604 et seq. If the "next closer" is not requested, whether the last input is requested by the input device 105 (switch 106) or not is checked (step 610), and if it is, the image ID currently stored in the register 407 is reported to the host device (step 611).

The above steps are repeated in a loop to display the movement of the vector cursor which changes from time to time.

Referring to FIGS. 7 to 14, another embodiment of the present invention is explained.

Figure 7:
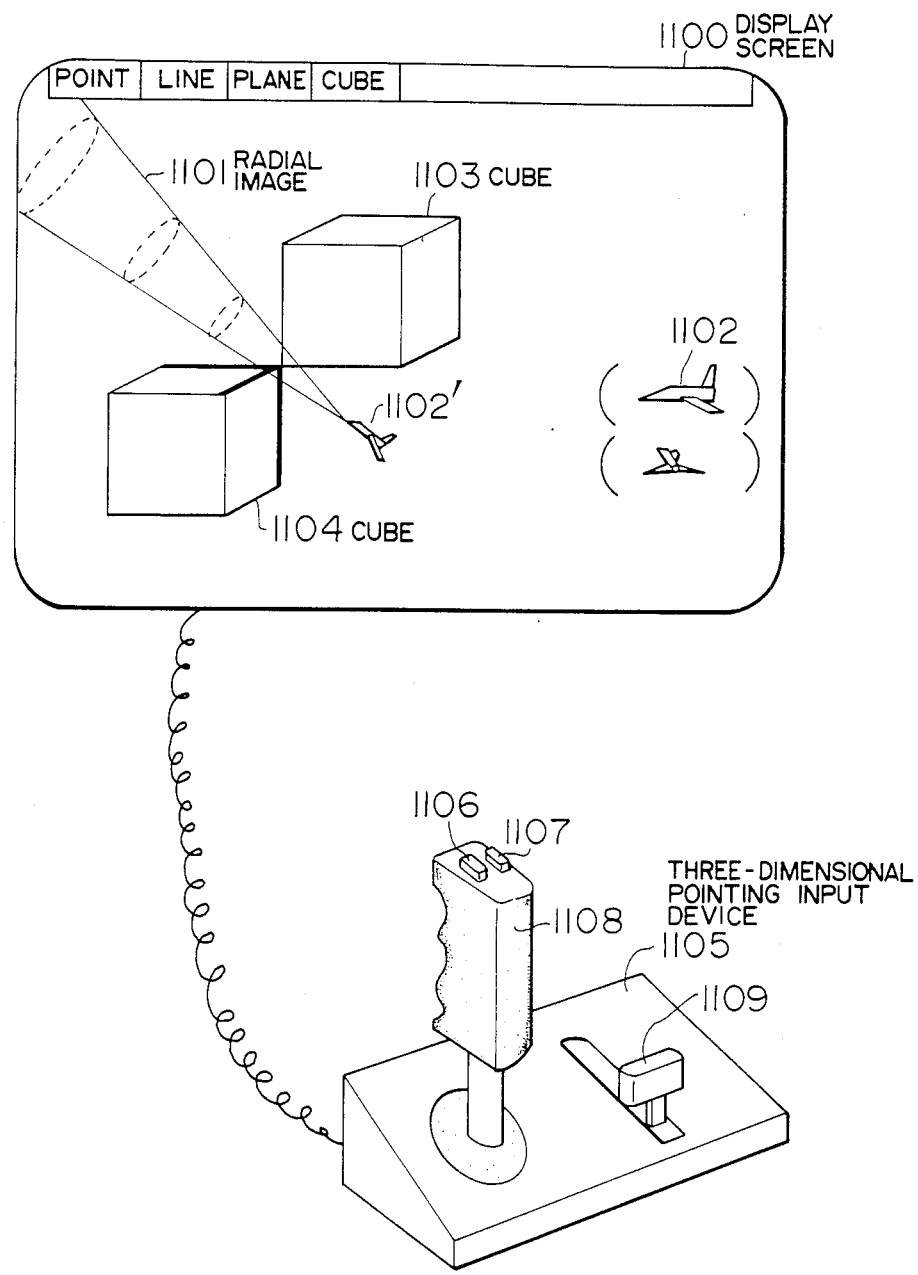
Figure 8:
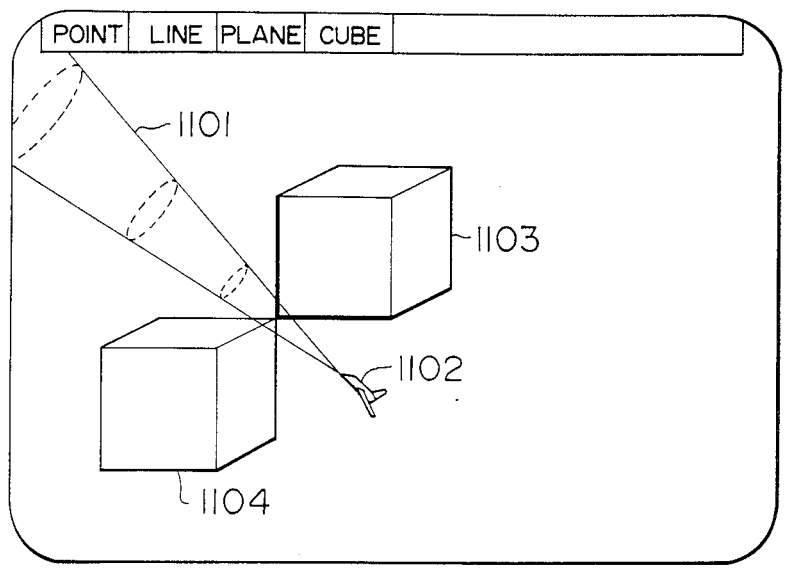
Figure 9:
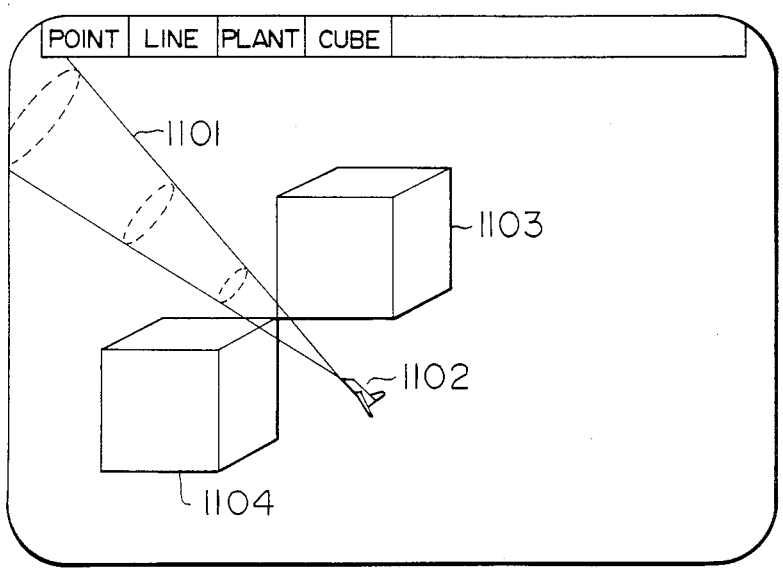

FIGS. 7 to 9 illustrate the second embodiment. In the present embodiment, the pointer is in the form of a radial image, such as a cone. An apex of the pointing radial image 1101 is in the display space and setting thereof in a selected is done by a vector cursor 1102. The apex is the vector cursor itself and the direction of an opening of the radial image (hereinafter simply referred to as direction) corresponds to the direction of the velocity vector of the vector cursor which continuously moves in the display space.

In FIG. 7, a curve 1103 and a cube 1104 which is in front of the cube 1103 in the displayed three-dimensional space are displayed on a display screen 1100. Let us assume that the operator intends to point to an apex at an upper rear side of the cube 1104 and input the identification into the host device. In the present embodiment, an image interface between the host device and the display device is an image command of a level close to a user designation, and development to picture elements or small images is not performed.

In order to point the apex, the operator manipulates the three-dimensional pointing input device 1105 to move the vector cursor 1102, selects a "point" by an icon at the top of the screen, moves the vector cursor to a vicinity of the target apex (1102' denotes the vector cursor after it has been moved) so that a pointing radial image 1101 having an apex thereof at the end point contains the target apex therein. The three-dimensional pointing input device 1105 includes a joy stick 1108 for controlling the direction of the vector cursor and a slide volume 1109 for controlling the velocity of the vector cursor. An input pointing switch 1106 and a "next closer" pointing switch 1107 are provided on the joy stick 1108. The velocity vector (speed and direction) of the vector cursor can be changed by the joy stick 1108 and the slide volume 1109.

When the operator moves the vector cursor from 1102 to 1102' on the display screen, the following cases may occur depending on the positional relationship of the cubes 1103 and 1104 in the three-dimensional space and the direction of the pointing radial image 1101.

(1) The pointing radial image 1101 contains the target apex of the cube 1104 and is closest to the apex of the pointing radial image among the apexes contained in the pointing radial image. In this case, three sides of the cube 1104 which define the target apex are highlighted. FIG. 7 shows this condition.

(2) The pointing radial image 1101 contains an apex of the cube 1103 which overlaps with the target apex of the cube 1104 on the display screen and is closes to the apex of the pointing radial image among the apexes contained in the pointing radial image 1101. FIG. 8 shows this condition.

(3) The pointing radial image 1101 contains none of the apexes of the cubes 1103 and 1104. FIG. 9 shows this condition. None is highlighted.

(4) Other case.

When the operator depresses the input pointing switch 1106 under the condition (1), it means that the operator points the highlighted apex and the coordinates of the apex are reported to the host system. Under the condition (2) or (4), if the target apex is contained in the pointing radial image 1101, the "next closer" pointing switch 1107 is actuated to shift the pointing to the target apex (for example, for FIG. 8 to FIG. 7). When the input pointing switch 1106 is now depressed, the coordinate of the target apex of the cube 1104 is reported to the host device.

Figure 10:
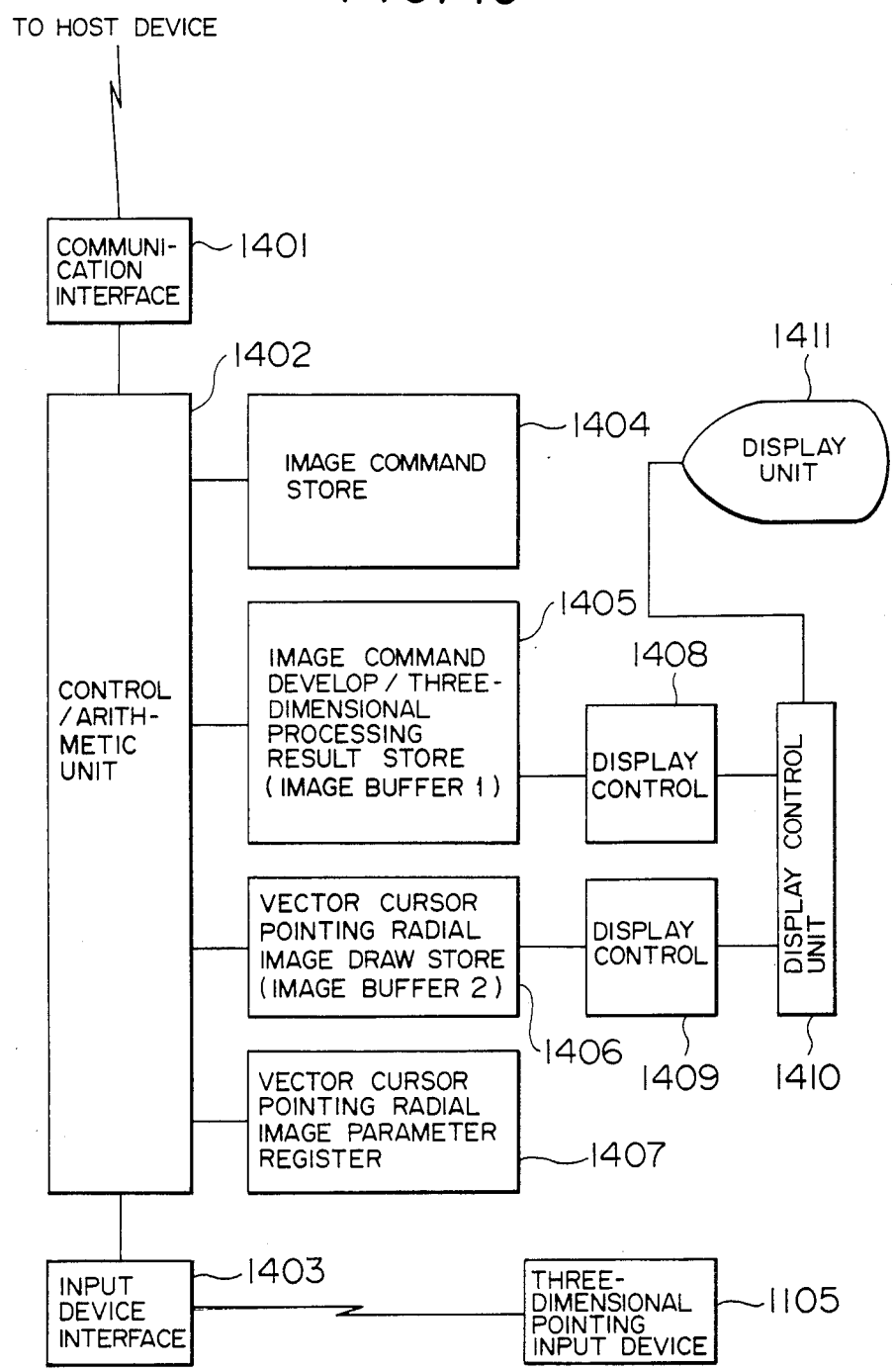
FIG. 10 shows a block diagram of the second embodiment of the present invention.

FIG. 10 shows a block diagram of the display device of the present invention.

An image command for the host device is received by a control/arithmetic unit 1402 through a communication interface and is stored into an image command store 1404. After the reception, the image command in the image command store 1404 is developed into dot information by the control/arithmetic unit 1042 and it is three-dimensionally processed such as by shading and the processed information is stored into an image command develop/three-dimension processing result store (image buffer 1) 1405. A three-dimensional image display control unit 1408 scans the image buffer 1405 and transfers a display signal to a display control unit 1410.

On the other hand, when the operator manipulates the three-dimensional pointing input device 1105, the information thereof is received by the control/arithmetic unit 1402 through an input device interface 1403. If it is related to the vector cursor, it is stored in a vector cursor pointing radial image parameter register 1407. When this register is updated, the control arithmetic unit 1042 modifies the velocity vector of the vector cursor accordingly. (The position and direction of the pointing radial image are also modified accordingly,)

The draw of the vector cursor pointing radial image which varies from time to time in accordance with the updating of the content of the register 1407 is stored in a vector cursor pointing radial image draw store (image buffer 2) 1406. The content of the image buffer 1406 is read by a vector cursor pointing radial image display control unit 1409 and transferred to a display control unit 1410 in the form of a display signal. The display control unit 1410 combines the display signals from the three-dimensional image display control unit 1408 and the vector cursor pointing radial image display control unit 1409 and displays the combined signal on a display 1411.

FIG. 11 shows a content of the vector cursor pointing radial image parameter register 1407. The vector cursor position #1 (pointing radial image apex) represents a coordinate ($P_{cx}$, $P_{cy}$, $P_{cz}$) of the vector cursor position in the displayed three-dimensional space. This point is also a start point of the pointing radial image. The vector velocity vector #2 (a direction of which is the same as that of the pointing radial image) represents a speed and a direction of the vector cursor by a vector ($V_x$-$V_y$, $V_z$). The velocity vector of the vector cursor is changed by the three-dimensional pointing input device 1105. When the joy stick 1108 and the slide volume 1109 are at neutral positions, the immediately previously set velocity vector is held and it continues to move in the displayed three-dimensional space. The direction of the pointing radial image corresponds to the direction of the velocity vector. The position #3 stores a type (point, line or plane) of the image to be pointed to in a coded form. The setting thereof is modified by pointing to an icon at the top of the screen by the vector cursor. The position #4 stores an integer n which represents the image number of the image closer to the apex of the pointing radial image. This value is modified by the switch 1107 of the three-dimensional pointing input device 1105. The position #5 stores an identifier on the interface to the host device, of the pointed image defined by the conditions #1–#3. When the type of the image pointed to is a "point", the coordinates, thereof are stored in the position #6.

Figure 12:
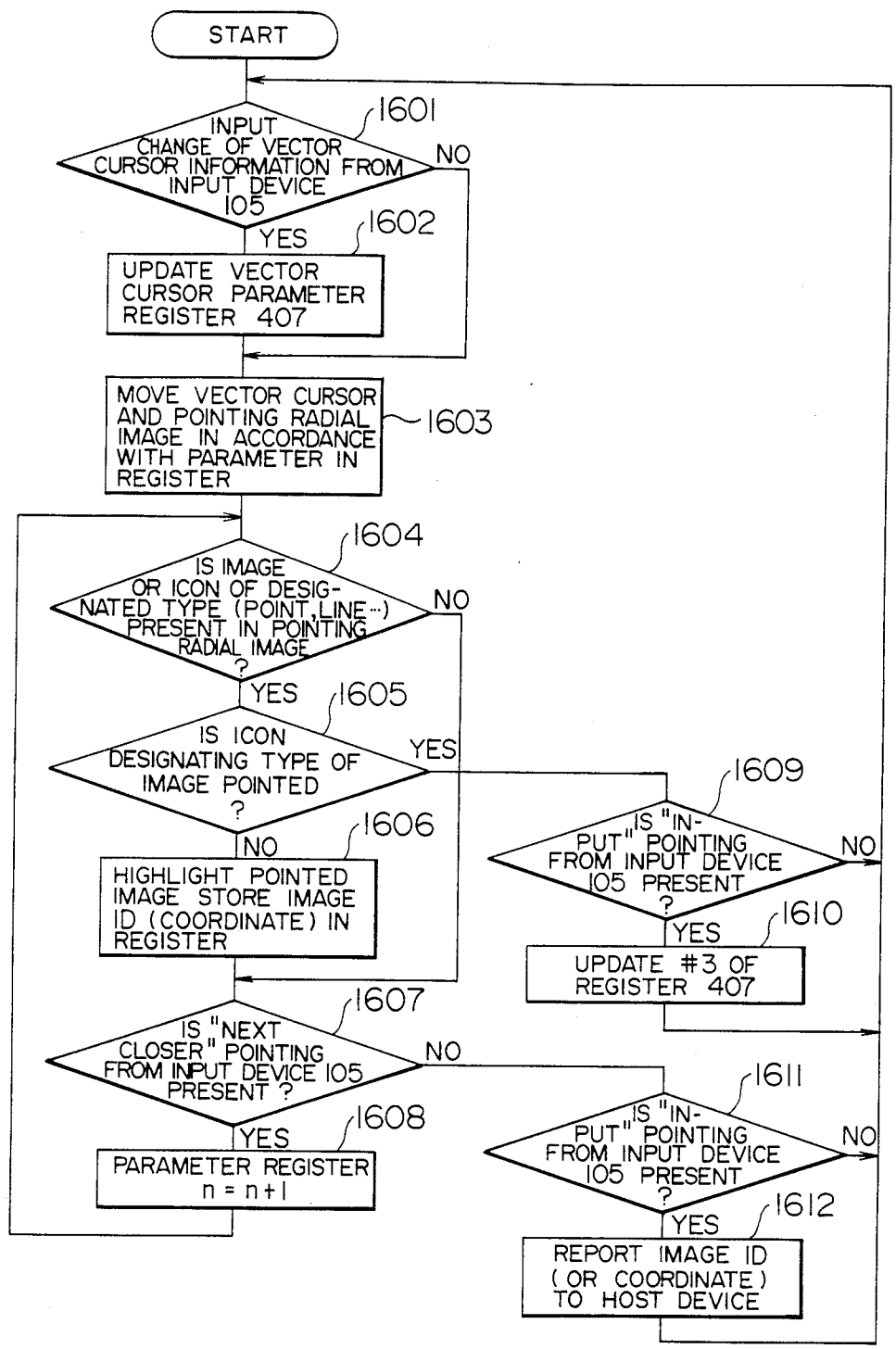
FIG. 12 shows a flow chart of an operation of a control/arithmetic unit of FIG. 10.
Figure 13:
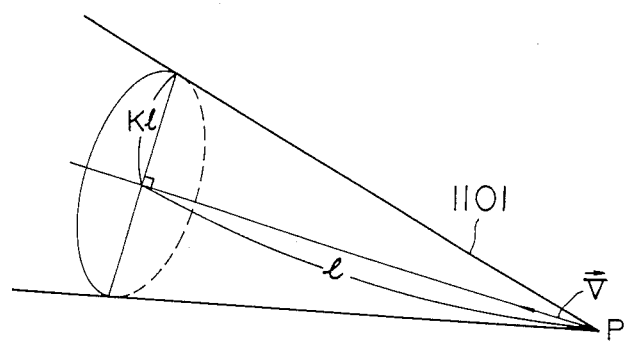
FIG. 13 shows a representation of a form of an aperture of a radial image.

FIG. 12 shows a flow chart of the operation of the present embodiment. It comprises processing relating to the movement of the vector cursor (steps 1601–1603), processing of detecting the pointing radial image and an image contained therein or an icon (steps 1604–1606) and input processing (steps 1607–1612).

The input from the three-dimensional pointing input device 1106 is determined (step 1601), and if it relates to the vector cursor (steps 1108 and 1109), the process proceeds to a step 1602, and if it does not relate to the vector cursor, the process skips the step 1602 and jumps to a step 1603.

The information relating to the vector cursor is stored in the register 1407 in accordance with FIG. 11

(step 1602), and the vector cursor is moved accordingly. The next position of the vector cursor and the position/direction of the pointing radial image are determined in accordance with the velocity vector of the vector cursor stored in the register 1407 (step 1603), and whether the displayed image or icon is pointed is determined (step 1604). Whether the displayed image is inside of the pointing radial image or not is determined by the vector information in the register 1407, the opening of radiation (which is constant in the system) and an equation of the displayed image (image command stored in 1404).

Figure 14:
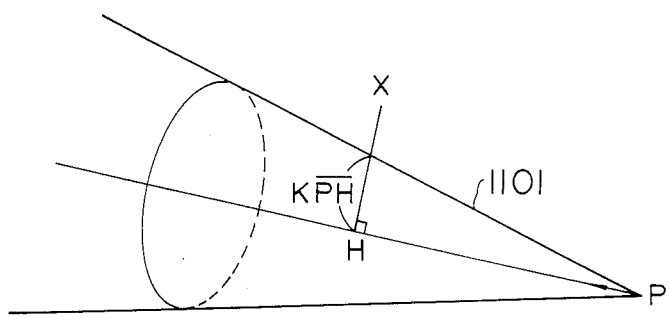
FIG. 14 illustrates a decision whether a point is within the radial image.

The determination of whether the displayed point is inside of the pointing radial image or not is explained. The pointing radial image is a cone and the opening thereof is defined by using k shown in FIG. 13. Let us assume a cone which forms a portion of the radial image, and which has a height l and a radial kl on a bottom plane (where k is a positive constant, for example ¼). The pointing radial image 1101 is represented by a set of circles on the bottom planes of cones when l is changed from 0 to ∞. Whether a point X in the display space is inside of the pointing radial image 1101 or not is determined by a relationship between distances $\overline{PH}$ and $\overline{XH}$, where XH is a normal line from the point X to the pointing radial image 1101 and PH is a distance between an origin point H of the radial image (that is, vector cursor) and H (FIG. 14). If the following relation is met, the target point is inside of the pointing radial image.

$$\overline{XH} \leq k \overline{PH}$$

When the image of the designated type or icon is present in the pointing radial image, and if the icon (the mark at the top of the screen to designate the type of image pointed) is designated (step 1605), the "input" pointing is received (step 1609) and the "type of image pointed" #3 is updated (step 1610), and the process returns to the beginning of the loop.

If the image is designated, it is highlighted and the image ID is stored in the register 1407 (step 1606). When none of the image and icon is present, the process skips the steps 1605 and 1616. Whether the three-dimensional pointing input device 1105 has pointed to the "next closer" image (by the switch 1107) or not is checked (step 1607), and if it has, the value n of the register 1407 is incremented by one (step 1608), and the process proceeds to a step 1604. If it has not, the presence or absence of the final "input" pointing from the input device 1105 (by the switch 1106) is checked (step 1611), and if it is present, the image ID (or coordinate of the point) currently stored in the register 1407 is reported to the host device (step 1612).

The above processing is repeated in a loop to display the movement of the vector cursor which changes from time to time.

In the present embodiment, the vector cursor continuously moves in accordance with the vector stored in the register 1407. Alternatively, when the image is not pointed to by the operator, the movement may be temporarily stopped by an additional function.

We claim:

1. A three-dimensional display device comprising:
   display means for displaying on a two-dimensional screen three-dimensional objects, a vector cursor virtually located in a three-dimensional space and moving in said space, and a pointer extending from the vector cursor in a direction of movement of the vector cursor for selectively identifying objects intercepted thereby in the three-dimensional space, in response to a display signal;
   input means for inputting a parameter for changing the direction of the vector cursor and a pointing signal for controlling said pointer to identify a three-dimensional object displayed by said display means; and
   control means connected between said display means and said input means for generating the display signal to display the three-dimensional objects, the vector cursor and the pointer, and including means for recognizing a three-dimensional object pointed to by said pointer in response to the pointing signal.

2. A three-dimensional display device according to claim 1, wherein said control means includes means for generating said display signal to display a line segment extending in the direction of movement of the vector cursor as said pointer.

3. A three-dimensional display device according to claim 2, wherein said control means includes means for identifying the three-dimensional object intercepted by said line segment at the closest point to said vector cursor, as the pointed to object in response to the pointing signal.

4. A three-dimensional display device according to claim 3, wherein said input means includes means for controlling said control means to indicate indentification of the three-dimensional object which is the n-th closest one to the vector cursor along said line segment, where n is a positive integer.

5. A three-dimensional display device according to claim 1, wherein said control means generates the display signal to display a radial image in the form of a cone extending from its apex at the vector cursor in the direction of movement of the vector cursor, as said pointer.

6. A three-dimensional display device according to claim 5, wherein said control means recognizes the three-dimensional object intercepted by the radial image and closest to the apex of the cone as the pointed to image in response to the pointing signal.

7. A three-dimensional display device according to claim 6, wherein said input means includes means for controlling said control means to indicate indentification of the three-dimensional object which is the n-th closest one to the apex of the cone forming the radial image, where n is a positive integer.

8. A method for pointing to a displayed image in a three-dimensional display device comprising the steps of:
   displaying on display means a plurality of three-dimensional objects, a vector cursor virturally located in a three-dimensional space and as moving in said space and a pointer extending from the vector cursor in a direction of movement of the vector cursor;
   supplying a parameter representing the direction of movement of the vector cursor to control means by input means;
   changing the movement of the vector cursor in accordance with the parameter; and
   identifying a three-dimensional object intercepted by said pointer in response to a pointing signal to instruct recognition of the three-dimensional object.

* * * * *